(12) United States Patent
Iida

(10) Patent No.: US 7,212,303 B2
(45) Date of Patent: May 1, 2007

(54) PRINT CONTROL METHOD FOR A MULTIFUNCTIONAL PRINTER INCLUDING A FACSIMILE FEATURE

(75) Inventor: Nobuyuki Iida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 812 days.

(21) Appl. No.: 10/207,218

(22) Filed: Jul. 30, 2002

(65) Prior Publication Data

US 2003/0025938 A1 Feb. 6, 2003

(30) Foreign Application Priority Data

Aug. 3, 2001 (JP) ............... 2001-236659
Oct. 1, 2001 (JP) ............... 2001-305107

(51) Int. Cl.
*G06F 3/12* (2006.01)

(52) U.S. Cl. ............... 358/1.15; 358/1.9; 358/434; 358/406; 358/468; 379/100.05; 379/100.15

(58) Field of Classification Search ............... 358/1.15, 358/434, 468, 1.9, 406; 379/100.15, 100.05
See application file for complete search history.

(56) References Cited

U.S. PATENT DOCUMENTS 5,579,447 A * 11/1996 Salgado ............... 358/1.9
5,748,337 A * 5/1998 Minamizawa ............... 358/468

FOREIGN PATENT DOCUMENTS

| JP | 07-007576 | | 1/1995 |
|---|---|---|---|
| JP | 07007576 A | * | 1/1995 |
| JP | 08-265469 | | 10/1996 |
| JP | 10-042112 | | 2/1998 |

* cited by examiner

*Primary Examiner*—Aung Moe
*Assistant Examiner*—Andrew Lam
(74) *Attorney, Agent, or Firm*—Fitzpatrick, Cella, Harper & Scinto

(57) ABSTRACT

A print control apparatus, which is connected to a multifunctional printer for printing images based on various data including at least facsimile data, comprises: a detector for detecting a call signal CI transmitted through a telephone line; a checker for checking the status of a print operation by the multifunctional printer, when the detector detects the call signal CI; and a controller for controlling timing of capturing the telephone line in response to the call signal CI detected by the detector, in accordance with the checked result of the checker. Thus, even if the call signal CI is detected while the print operation is being performed, the print operation can be optimally controlled, and also timing to capture the line can be controlled.

3 Claims, 18 Drawing Sheets

| PAGE | 1 | 2 | 3 | 4 |
|---|---|---|---|---|
| RENDERING TIME ESTIMATION | 10.0 | 20.0 | 10.0 | 8.0 |
| PRINT DATA TRANSFER TIME ESTIMATION | 2.0 | 3.0 | 1.0 | 2.0 |
| ENGINE UNUSED TIME | 10.0 | 14.0 | 3.0 | 3.0 |

PRINT CONTROL METHOD FOR A MULTIFUNCTIONAL PRINTER INCLUDING A FACSIMILE FEATURE

BACKGROUND OF THE INVENTION

1. Field of the Invention

The present invention relates to a method and an apparatus which control printing by a multifunctional printer capable of performing, e.g., printing of an image or the like based on data received by facsimile communication, in addition to printing of print data sent from a host apparatus.

2. Related Background Art

Conventionally, a print mechanism which adopts a host-base printer as a multifunctional printer is known.

Incidentally, there is known a "PDL (page description language) printer" which receives PDL data from a host computer, performs a rendering process or the like to the received data by interpreting it, generates print data based on the rendering-processed data, and then prints the generated data. Unlike the PDL printer, the host-base printer receives print data generated based on the rendering process or the like on the side of the host computer, and then prints the received data. Since the host-base printer can sufficiently use the capability on the side of the host computer, the structure on the side of the printer can be simplified, whereby an inexpensive print mechanism can be provided.

Incidentally, in the multifunctional printer to which the host-base printer as above is adopted, it is necessary to print, in addition to the image based on the print data sent from the host computer, an image based on the data received in facsimile communication.

The multifunctional printer of this type might receive facsimile data while it is printing the print data sent from the host computer. In such a case, conventionally, when the facsimile data is received, the printer once discontinues printing the data sent from the host computer and instead prints the received facsimile data.

The process in this case will be explained in detail with reference to FIG. 19.

FIG. 19 is a timing chart showing a facsimile reception process during a print process in a conventional information processing system (composed of a host computer and a multifunctional machine). Here, it is assumed that time runs from the left to the right in the drawing.

In FIG. 19, symbol R1 represents a rendering process of the first page in a print job by the host computer (a printer driver). Here, it should be noted that the rendering process is to expand print-target data into a print image and then compress this image according to run-length encoding. In the following explanation, the numeral included in the symbol represents the target page number.

Symbol T1 represents a process to transfer the print data of the first page from the host computer to the multifunctional machine.

Symbol P1 represents a process of a printer engine of the multifunctional machine to print the print data of the first page sent from the host computer.

Symbol FP1 represents a process of the printer engine of the multifunctional machine to print the facsimile data of the first page.

Symbol FPr1 represents a process of the printer engine of the multifunctional machine to exchange a protocol signal to a partner's station to receive the facsimile data of the first page, symbol FR1 represents a process to actually receive the facsimile data of the first page, and an symbol D1 represents a process to transfer the facsimile data of the first page received by a facsimile unit to a printer controller through a DMA (direct memory access) channel.

First, the rendering process of the print job by the host computer starts (R1 in FIG. 19). Then, if a call signal is input from a telephone line to the facsimile unit (CI) while the print data of the first page is being transferred and printed (T1, P1), an off-hook operation is performed to start a protocol process of facsimile communication (FPr1), and the facsimile data of the first page is received (FR1). Thus, by such a series of processes, a start of the facsimile data reception is notified to the host computer, and the printing of the print data is discontinued at the time that the printing of the first page ends, whereby the printer comes to be on standby for the facsimile data printing.

If the reception of the facsimile data of the first page ends (FR1), the received data is transferred to the printer controller (D1), and the printing of the transferred data starts (FP1). Then, after the reception of the data of the first page ends, the facsimile unit performs the protocol process for the facsimile data of the second page (FPr2), whereby the facsimile data of the second page is received (FR2). After the reception of the facsimile data of the second page ends, the received data is transferred to the printer controller (D2), and the transferred data is printed (FP2). Then, if the printing of the facsimile data ends as a whole, the discontinued print job restarts. That is, after the rendering process is performed (R2), the print data from the second page is transferred from the host computer to the multifunctional machine (T2), and the transferred data is printed (P2).

As described above, conventionally, if the facsimile data is received during the printing of the data sent from the host computer, the printing of the data sent from the host computer is discontinued, and interrupt for the facsimile data printing is performed. Therefore, even if the printing of the print data will end by another one page (for a short while), the interrupt for the facsimile data printing is performed, whereby there is inconvenience that the print job on the side of the host computer has to wait for the end of the printing of the facsimile data.

On the other hand, if the facsimile data is received while the data sent from the host computer is being printed, there might be of course a large amount of the remainder of the print data sent from the host computer.

In this case, although the print data sent from the side of the host computer is sequentially rendering-processed and transferred after the printing of the facsimile data ends, the printer engine of the multifunctional machine is in an operation suspend state during the rendering and transfer processes, whereby the operation is inefficient as a whole.

SUMMARY OF THE INVENTION

An object of the present invention is to provide control method and apparatus for a multifunctional printer, by which such a problem as above can be eliminated.

Another object of the present invention is to control a print operation in an optimum way when data is received during the print operation.

Still another object of the present invention is to control timing of capturing a line in accordance with the remainder of print data sent from a host apparatus.

Still another object of the present invention is to control interrupt for another print process in accordance with the status of the print operation.

Still another object of the present invention is to control plural print processes on the side of the host apparatus connected to the multifunctional printer.

The above and other objects of the present invention will become apparent from the following detailed description based on the attached drawings.

DETAILED DESCRIPTION OF THE PREFERRED EMBODIMENTS

Hereinafter, the preferred embodiments of the present invention will be explained with reference to the attached drawings.

First Embodiment (Entire Structure)

Figure 1:
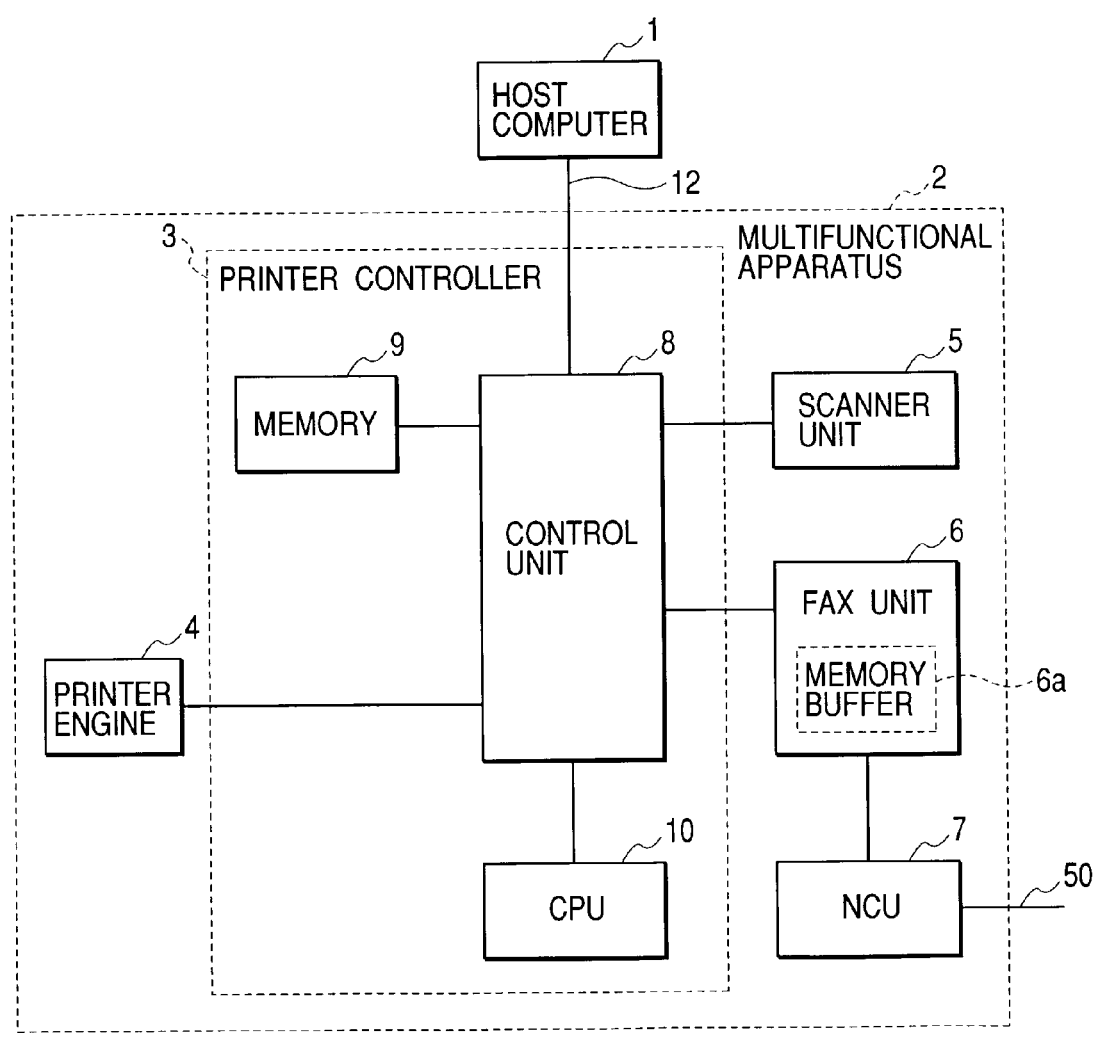
FIG. 1 is a block diagram showing the structure of a multifunctional machine included in an information processing system according to the first to third and fifth embodiments of the present invention.

FIG. 1 is a block diagram showing the structure of a multifunctional machine included in an information processing system according to the first embodiment of the present invention.

In FIG. 1, numeral 1 denotes a host computer which is connected to a multifunctional machine 2. The multifunctional machine 2 which includes a host-base printer is composed of a printer controller 3, a printer engine 4, a scanner unit 5, a FAX (facsimile) unit 6 and an NCU (network control unit) 7.

The host-base printer receives print data such as print-target data subjected to a rendering process and the like on the side of the host computer and then prints the received print data.

As the printer engine 4, a laser beam printer which turns on/off a laser according to an image signal and thus forms a print image on a recording sheet according to a known electrophotographic process, and an ink-jet printer which forms a print image by emitting ink droplets onto a recording sheet according to an image signal can be adopted. Of course, it is needless to say that a printer engine of another system can be adopted.

The data read by the scanner unit 5 and the data received by the FAX unit 6 are transferred to the printer controller 3 through an interface. The NCU 7 controls the connection with a telephone line 50 when facsimile data is transmitted and received by the FAX unit 6.

Moreover, the FAX unit 6 contains a memory buffer 6a to store the received data and the like.

Numeral 8 denotes a control unit of the printer controller 3, which includes the high-speed interface to the scanner unit 5 and the FAX unit 6 and an interface to the host computer 1. Moreover, the printer controller 3 further includes an interface to a memory 9 temporarily storing a print image, and a CPU 10 which controls the printer control 3 as a whole. The print images temporarily stored in the memory 9 are input from the host computer 1, the scanner unit 5 and the FAX unit 6, respectively. The printer controller 3 can decode the print data (having a format compressed according to run-length encoding after the rendering process) transferred from the host computer 1, the image data of non-compressive form transferred from the scanner unit 5, and encoded data (having a format based on G3 facsimile standard such as MH (Modified Huffman) coding, MR (Modified READ (relative element address) coding or the like) transferred from the FAX unit 6, and then print the decoded data.

The data is transferred from the FAX unit 6 to the printer controller 3 through a DMA channel.

(Structure of Host Computer)

Figure 2:
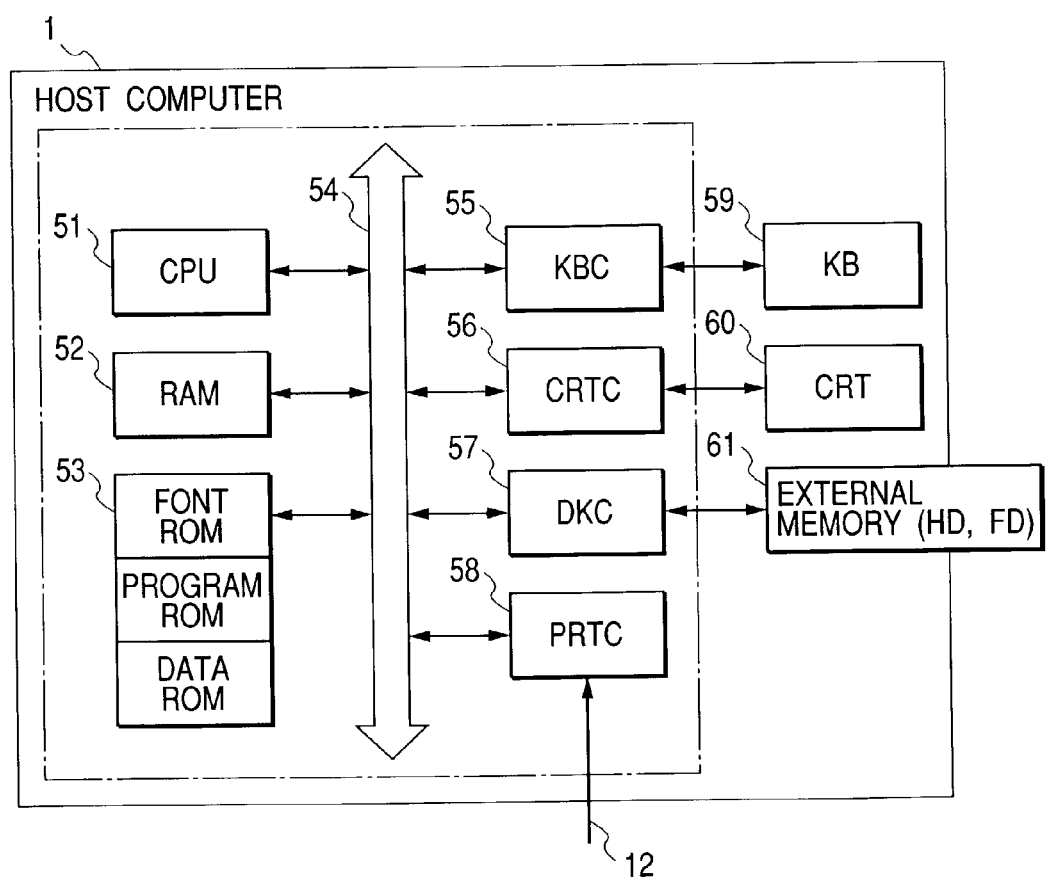
FIG. 2 is a block diagram showing the structure of a host computer according to the embodiment of the present invention.

FIG. 2 is a block diagram showing the structure of the host computer 1 shown in FIG. 1.

The host computer 1 includes a CPU 51 which performs a document process to a document mixedly including figurers, images, characters, tables (including spreadsheets) and the like on the basis of a document processing program or the like stored in a program ROM of a ROM 503 or an external memory 61 such as an HD (hard disk), an FD (floppy disk) or the like, and which collectively controls the respective devices connected on a system bus 54.

Moreover, an OS (operating system) program and the like being the control program of the CPU 51 are stored in the program ROM of the ROM 53 or the external memory 61, font data and the like to be used in the document process are stored in a font ROM of the ROM 53 or the external memory 61, and various data to be used in the document process and the like are stored in a data ROM of the ROM 53 or the external memory 61. A RAM 52 functions as a main memory and a working area for the CPU 51.

A KBC (keyboard controller) 55 controls key input from a KB (keyboard) 59 and a not-shown pointing device, and a CRTC (CRT controller) 56 controls display on a CRT 60.

Numeral 57 denotes a DKC (disk controller) which controls accessing to the external memory 61 such as the HD, the FD and the like storing a boot program, applications for various function units, the font data, user files, editing files, a printer control command generation program (called a printer driver hereinafter) and the like.

Moreover, the printer driver for generating print data to be transferred to the host-base printer is installed in the host computer 1, and the print-target data given by the various applications are rendering-processed and expanded into image data by the printer driver. After then, the obtained image data is compressed based on run-length data to generate the print data, and the compressed print data is transferred to the multifunctional machine 2 according to a predetermined transfer protocol through a line 12, whereby the transferred data is printed. Here, it should be noted that a program concerning control of print timing explained later may be incorporated in the printer driver or provided as a control program independently of the printer driver. In the latter case, the CPU 51 performs the process by loading the control program into the RAM 52.

(Facsimile Reception Process in Printer Print Process)

(A) Flow of Each Process

Figure 3:
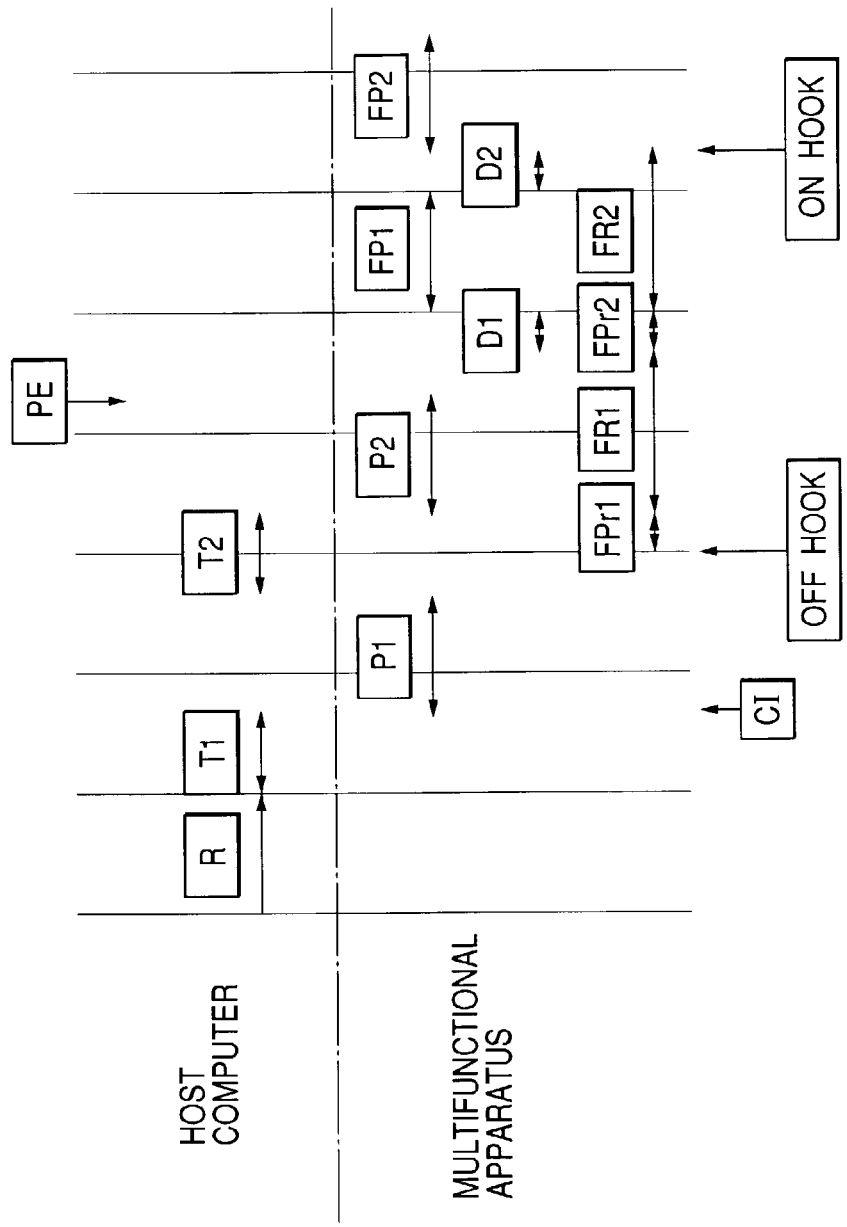
FIG. 3 is a timing chart showing a facsimile reception process in a printer print process in the information processing system according to the first embodiment.

FIG. 3 is a timing chart showing the facsimile reception process in the printer print process in the information processing system (composed of the host computer 1 and the multifunctional machine 2) according to the first embodiment.

In FIG. 3, symbol R represents a time taken for the rendering process (the process to convert the print-target data into the print image data and then compress the converted data) of one print job performed by the host computer 1, and symbol PE represents a print end time previously estimated before the rendering process is performed.

Symbol T1 represents a time taken for the process of transferring the print data of the first page from the host computer 1 to the multifunctional machine 2, and symbol T2 represents a time taken for the process of transferring the print data of the second page from the host computer 1 to the multifunctional machine 2.

Symbol P1 represents a time taken for the process of the printer engine 4 of the multifunctional machine 2 to print the print data of the first page transferred from the host computer 1. Here, it should be noted that, during times other than the times P represented by the arrows in the drawing, the printer engine 4 is in an unused state (suspend state). Symbol P2 represents a time taken for the process of the printer engine 4 of the multifunctional machine 2 to print the print data of the second page transferred from the host computer 1.

Symbol FP1 represents a time taken for the process of the printer engine 4 of the multifunctional machine 2 to print the facsimile data of the first page received from the FAX unit 6, and symbol FP2 represents a time taken for the process of the printer engine 4 of the multifunctional machine 2 to print the facsimile data of the second page received from the FAX unit 6.

Symbol FPr1 represents a protocol process (to determine transfer speed, a sheet size, etc.) of the FAX unit 6 to receive the data of the first page, and symbol FR1 represents a process of the FAX unit 6 to receive the data of the first page.

Symbol FPr2 represents a protocol process (to determine transfer speed, a sheet size, etc.) of the FAX unit 6 to receive the data of the second page, and symbol FR2 represents a process of the FAX unit 6 to receive the data of the second page.

Symbol D1 represents a process of the FAX unit 6 to transfer the data of the first page received through the telephone line 50 to the printer controller 3 through a DMA channel, and symbol D2 represents a process of the FAX unit 6 to transfer the received data of the second page to the printer controller 3 through the DMA channel.

Symbol CI represents a point of time when a call signal is received through the telephone line 50, symbol OFF HOOK represents a point of time when the FAX unit 6 performs an off-hook operation to capture the telephone line 50, and symbol ON HOOK represents a point of time when the FAX unit 6 performs an on-hook operation to disconnect the telephone line 50.

Next, the facsimile reception process in the printer print process according to the present embodiment will be explained concretely with reference to FIG. 3.

First, the rendering process of the print job by the host computer 1 starts (R in FIG. 3), and a call signal is input to the FAX unit 6 (CI) while the print data of the first page is being printed (T1, P1). At this time, if the reception of the call signal is notified to the host computer 1, a time capable of suspending the off-hook operation is calculated on the basis of the print job end time estimated beforehand and the time until the data of the first page can be transferred from the FAX unit 6 to the printer controller 3.

Then, it is determined whether to perform the interrupt for the printing of the FAX unit 6 by suspending the current print job or to start the data reception after delaying the time to perform the off-hook operation to some extent without suspending the print job. Here, it should be noted that the time to perform the off-hook operation is determined in consideration of the print job end time estimated beforehand and the time until the reception of the print data of the first page of the FAX unit 6 ends. Besides, if the time to delay the off-hook operation is too long, there is a fear that a transmission station side discontinues a calling process, whereby the maximum time to delay the off-hook operation is set to, e.g., 30 seconds or so to prevent such inconvenience.

In the present embodiment, since the facsimile data is received without suspending the print job (i.e., the facsimile data is received after delaying the off-hook operation), the print job can end while reception timing is being delayed. Thus, it is possible to prevent the inconvenience that is caused when the side of the host computer 1 suspends the print job and waits for the interrupt process, thereby improving entire print efficiency.

While the print job of the host computer 1 is continued (T2, P2), an off-hook instruction of the host computer 1 is received by the FAX unit 6 (OFF HOOK). Then, if the off-hook operation is performed, the telephone line 50 is captured to start performing facsimile communication with a partner's station, the protocol process to receive the facsimile data of the first page is performed (FPr1), and then the data of the first page is received (FR1).

Then, it is confirmed whether or not an unused buffer exists in the printer controller 3. After it is confirmed that the unused buffer exists, the received data is transferred (D1), and the data is printed (FP1). Then, the facsimile data of the second page is printed in the same way, and the on-hook operation is performed if the reception of the facsimile data is completed (ON HOOK), and the telephone line 50 is disconnected.

As above, according to the present embodiment, as compared with the ordinary case (i.e., the case where the print job is not performed), the off-hook timing is delayed from the point of time when the call signal is received. Thus, the print job instructed by the host computer 1 is continued until the end without any discontinuation, and subsequently the printing of the FAX unit 6 is performed, whereby the printing can be efficiently performed as a whole. That is, it is possible to prevent the inconvenience that the side of the host computer 1 suspends the print job and waits for the slightly remaining other process.

(B) Process of Host Computer

Figure 4:
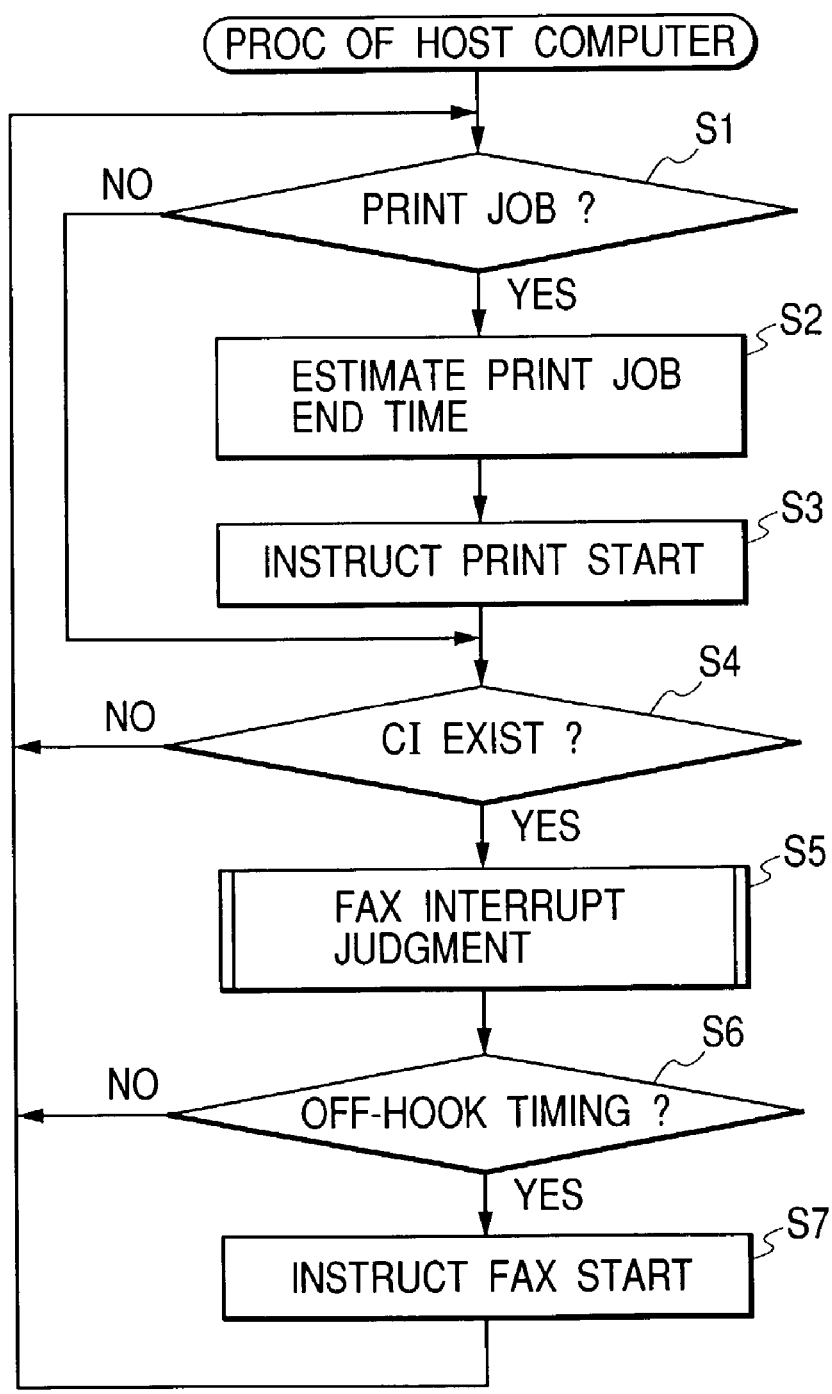
FIG. 4 is a flow chart showing the process of the host computer according to the first embodiment.

FIG. 4 is a flow chart showing the process of the host computer 1 according to the first embodiment. Here, it should be noted that the program according to this flow chart is stored in the ROM 53 of the host computer 1 or the external memory 61, and the stored program is read and executed, whereby the following control method can be achieved.

First, in a step S1, it is judged whether or not the print job exists in the host computer 1. If judged that the print job exists, the time that the print job ends is estimated in a step S2. Then, in a step S3, the print start in the print job is instructed. That is, the rendering process, the data transfer, the print execution and the like concerning the print are instructed.

In a step S4, it is judged whether the call signal CI is arrived in the FAX unit 6 of the multifunctional machine 2 or the facsimile data is being received by the FAX unit 6. If judged that the call signal CI is arrived in the FAX unit 6, the flow advances to a step S5 to execute the subroutine to calculate the off-hook timing (explained in FIG. 5).

Then, in a step S6, it is further judged whether or not it is in the exact off-hook timing (time) set in the step S5. If judged that it is in the off-hook timing, the flow advances to a step S7 to instruct the multifunctional machine 2 to start the data reception by the FAX unit 6, and the flow then returns to the first step S1.

On the other hand, if it is judged in the step S1 that the print job does not exist in the host computer 1, the flow advances to the step S4. Moreover, if it is judged in the step S4 that the call signal CI is not arrived, and if it is judged in the step S6 that it is not in the off-hook timing, the flow returns to the first step S1.

Figure 5:
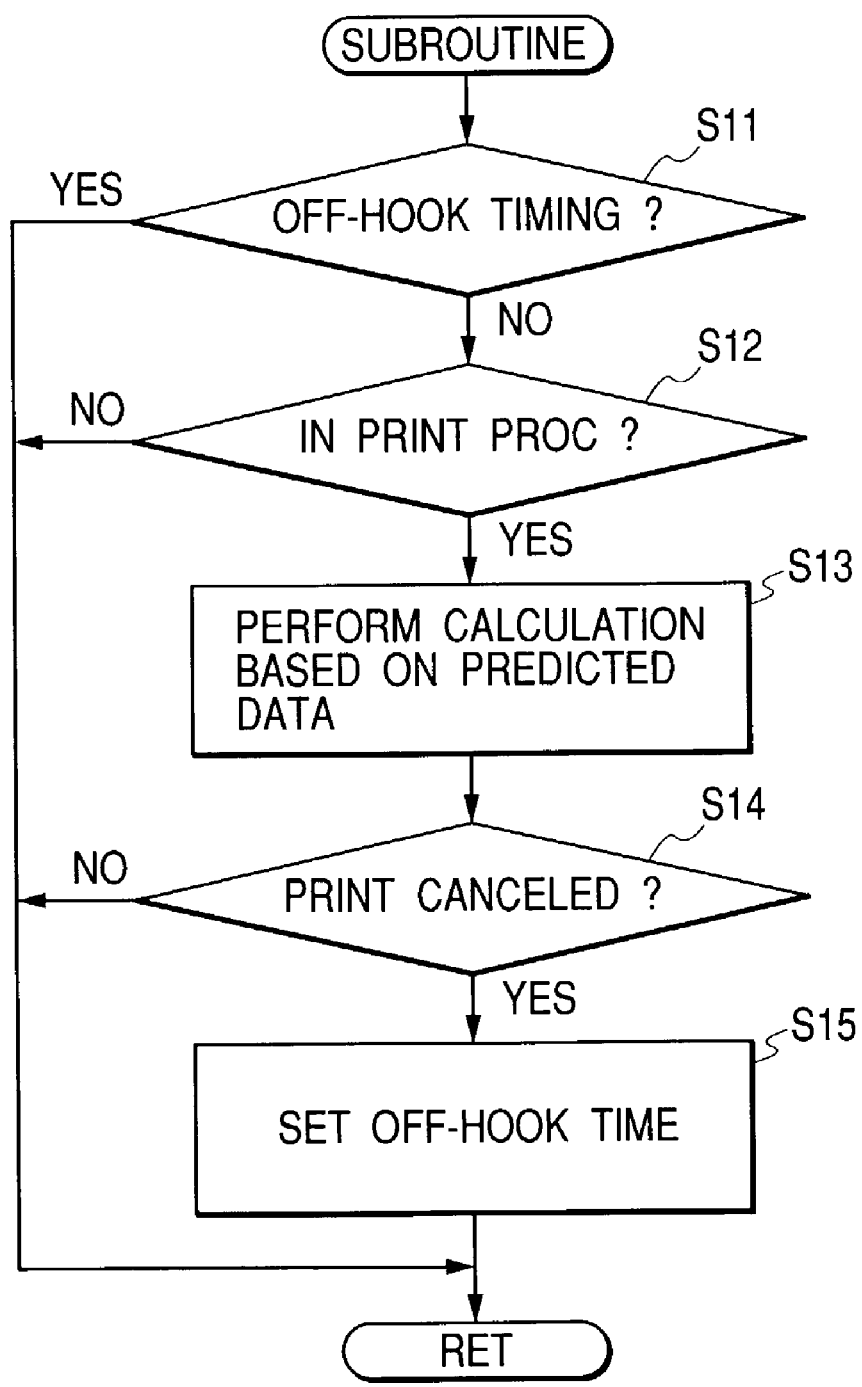
FIG. 5 is a flow chart showing a subroutine of a facsimile interrupt judgment process.

FIG. 5 is a flow chart showing the facsimile interrupt judgment process to be performed in the step S5 of FIG. 4.

First, in a step S11, it is judged whether or not the off-hook timing of the FAX unit 6 has been set. If judged that the off-hook timing is not set, the flow advances to a step S12.

In the step S12, it is further judged whether or not the print process of the print job from the host computer 1 is being performed. If judged that the print process is being performed, the flow advances to a step S13. In the step S13, the calculation to determine whether the print process should be discontinued or continued without discontinuation is performed in consideration of the print job end time estimated in the step S2 and the time that the reception of the data of the first page of the FAX unit 6 is completed. Then, in a step S14, it is judged based on the result calculated in the step S13 whether or not the print process should be discontinued. If judged that the print process should be discontinued, the time to perform the off-hook operation is set in a step S15.

For example, the time that the print job ends is estimated as follows.

1. The printer speed (ppm) is stored beforehand in the host computer together with sheet size. Here, it is assumed in the present embodiment that the data of A4 sheet is printed. That is, the data of one A4 sheet can be printed by 4 seconds with the printer speed of 15 ppm (P).
2. The data transfer speed between the host computer 1 and the multifunctional machine 2 is calculated beforehand. That is, the calculated speed is 1 MB/s.
3. The time taken for the host computer 1 to perform the rendering process of the data of the remaining pages in the print job and the number of bytes of the print data to be transferred to the printer are estimated. Here, the rendering time R2 is estimated as 10 seconds, the number of print data is estimated as 2 MB, and the transfer time T2 of the print data is calculated as T2=2 MB÷1 MB/s=2 seconds.
4. If the timing of the print start by the printer is set when the data transfer to the printer controller 3 ends, the time taken to print the data of the remaining pages is calculated as 4 seconds+10 seconds+2 seconds=16 seconds.

Therefore, on the assumption that the call signal CI is arrived immediately after the time T1, if the off-hook operation is performed at the point of time elapsing from that time by 16 seconds, the facsimile reception and the print process can be performed by a minimum buffer use amount.

(Print Process of Multifunctional Machine 2)

Figure 6:
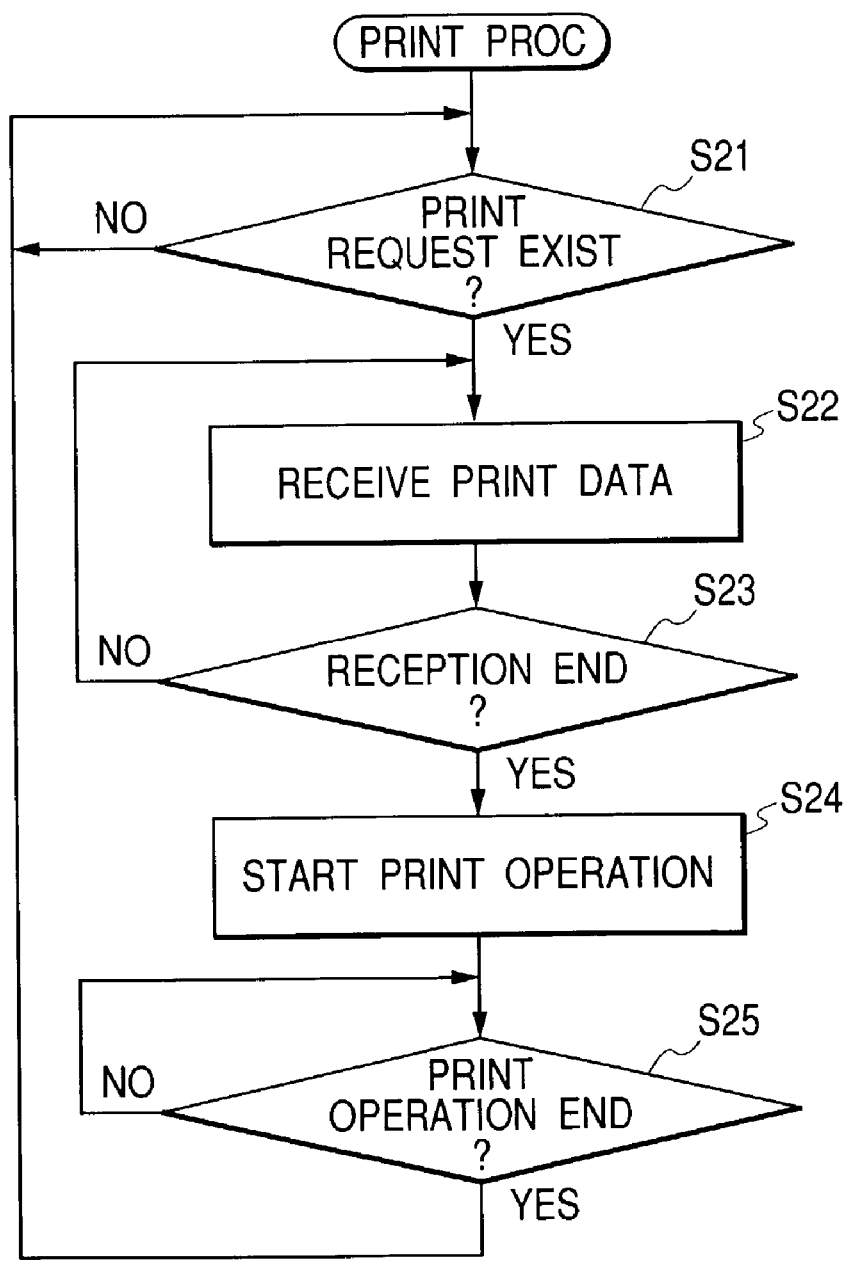
FIG. 6 is a flow chart showing a process concerning printing of the multifunctional machine according to the embodiment of the present invention.

FIG. 6 is a flow chart showing the printing of the multifunctional machine 2 according to the present embodiment.

It should be noted that the print process shown in this flow chart is a part of the process to be performed by the printer controller 3, and a program concerning the operation to return the information of the FAX unit 6 to the host computer 1 exists independently. Hereinafter, a procedure concerning the print process will be explained. Here, it should be noted that the program according to this flow chart is stored in the memory of the control unit 8, and the stored program is read and executed, whereby the following control method can be achieved.

First, in a step S21, it is judged whether or not a print request issued from the host computer 1 or the FAX unit 6 exists. If judged that the print request exists, the flow advances to a step S22 to transfer the print-requested print data from the host computer 1 or the FAX unit 6 to the memory 9 in the printer controller 3.

Then, if the print data corresponding to the one page is received (step S23), the received print data of the one page is transferred to the printer engine 4, and the printing starts (step S24). Then, the above operation is continued until the print process ends (step S25).

By the above procedure, in the case where the call signal to receive the facsimile data is received while the print process of the print job from the host computer 1 is being performed, it is judged whether or not the facsimile data is printed by the interrupt, and the timing (time) to respond to the data reception of the FAX unit 6 is set, whereby the printing can be efficiently performed. Moreover, since such control is performed by the host computer 1, even if the host-base printer is adopted, the print job end time can be accurately obtained and the off-hook operation can be performed at more appropriate timing, and further a load on the side of the multifunctional machine 2 can be reduced.

Incidentally, on the side of the multifunctional machine 2, if the call signal from the telephone line 2 is arrived in the state that there is no print instruction from the host computer 1, it is possible to perform the off-hook operation at ordinary timing, capture the telephone line 50, start the facsimile reception, and perform the printing, without notifying the host computer 1 of the call signal arrival.

Moreover, of course, it is needles to say that the printing by the multifunctional machine 2 includes a copy job to print the image data transferred from the scanner unit 5.

Moreover, in the multifunctional machine 2, a sorter to sort the sheets on which the images have been printed respectively and which are then discharged may be provided, so as to prevent inconvenience that the sheets are confusingly mixed, by sorting the sheets according to whether the printing instructed from the host computer 1 is performed, the printing is performed to the facsimile-received data, or the printing is performed by a copy operation.

Second Embodiment

In the present embodiment, in a case where data reception by a FAX unit 6 is performed without discontinuing a print job in a print process by a host computer 1, if the printing seems to become longer beyond an estimated print end time, communication speed in facsimile reception of a next page is lowered so as to achieve memory-saving.

In the present embodiment, it should be noted that the structures of the host computer 1 and a multifunctional machine 2 are the same as those in the first embodiment.

Figure 7:
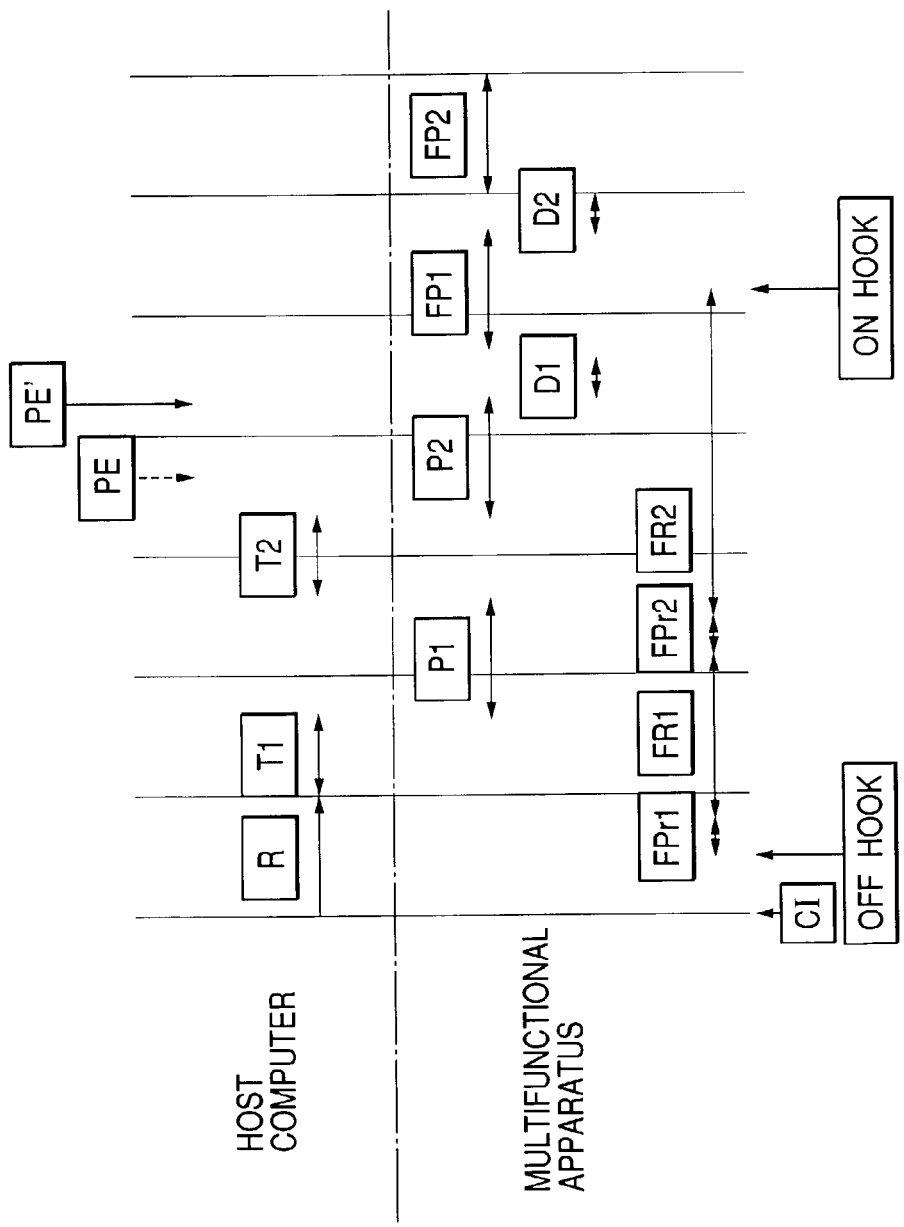
FIG. 7 is a timing chart showing a facsimile reception process in a printer print process in the information processing system according to the second embodiment.

FIG. 7 is a timing chart showing a facsimile reception process in a printer print process in an information processing system (composed of the host computer 1 and the multifunctional machine 2) according to the second embodiment of the present invention.

While the print process of the data transferred from the host computer 1 is being performed by the multifunctional machine 2, if a call signal CI is arrived through a telephone line 50 and such a fact is notified to the host computer 1, then it is judged whether or not the print process should be discontinued, on the basis of a print end time PE estimated beforehand and a time until the facsimile data of the first page is received.

As a result, in an example of the present embodiment, off-hook timing by the FAX unit 6 is delayed without discontinuing the print process, and it is judged that the facsimile data is printed after the estimated print end time PE of the print job. However, since the print end is practically delayed beyond the estimated print end time PE (a practical print end time is represented by symbol PE'), it is estimated that the FAX unit 6 becomes short in the buffer capacity (a memory buffer 6a) to store the data of the second page. Therefore, in response to an instruction issued from the host computer 1, the facsimile data is received by lowering the data reception speed of the second page (FR2).

Figure 8:
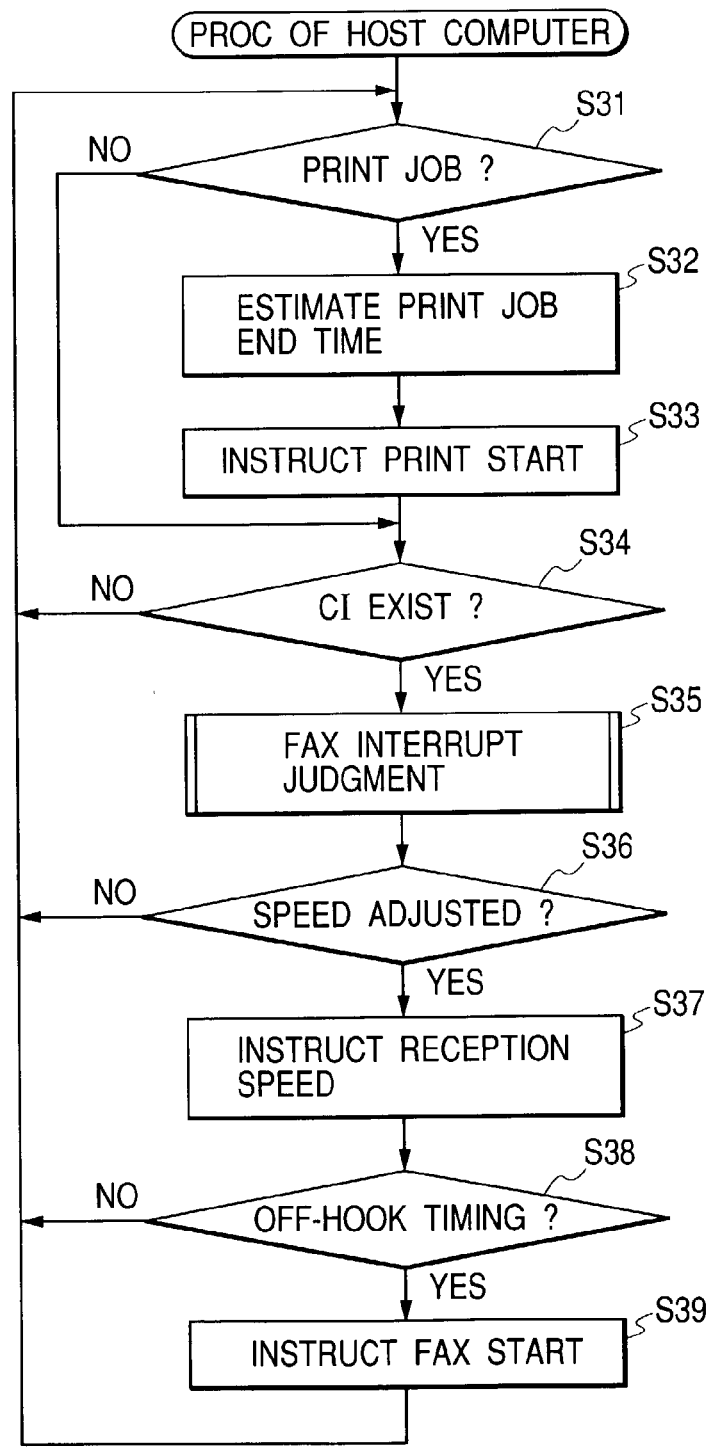
FIG. 8 is a flow chart showing the process of the host computer according to the second embodiment.

FIG. 8 is a flow chart showing the process of the host computer 1 according to the second embodiment. Here, it should be noted that the program according to this flow chart is stored in a ROM 53 of the host computer 1 or an external memory 61, and the stored program is read and executed, whereby the following control method can be achieved.

In the present embodiment, it should be noted that processes in steps S31 to S35 are the same as those in the steps S1 to S5 (FIG. 4) of the first embodiment.

Then, in a step S36, the reception status by the FAX unit 6 is obtained, and it is judged based on the obtained status whether or not the data reception should be performed by lowering the communication speed for the data of the next page. That is, if it is judged that the printing becomes longer beyond the estimated print end time, it is judged that the data of the next page should be received by lowering the communication speed, whereby the flow advances to a step S37 to instruct the multifunctional machine 2 to receive the data of the next page at the communication speed obtained in the step S36.

In a next step S38, it is judged whether or not the current time is the off-hook timing (time) set in the step S35. If judged that the current time is the off-hook time, the flow advances to a step S39 to instruct the multifunctional machine 2 to start receiving the facsimile data.

According to the present embodiment, in the case where the data reception by the FAX unit 6 is performed without discontinuing the print job in the print process of the host computer 1, the reception status by the FAX unit 6 is first obtained, and the data reception is performed by lowering the communication speed for the data of the next facsimile-received page if it is judged that the printing becomes longer beyond the estimated print end time, whereby the capacity of the memory buffer 6a to store the received data can be reduced, or the memory capacity used to receive the facsimile data can be reduced.

Incidentally, although the communication speed is lowered to delay the facsimile data reception in the present embodiment, it is needless to say that the same object as above can be achieved by flow control or the like.

Third Embodiment

In the present embodiment, a time that a printer engine is not used is estimated on the basis of a time taken to a rendering process by a host computer 1, and facsimile-received data is printed during the estimated time, whereby availability factor of a printer is improved as a whole.

In the present embodiment, it should be noted that the structures of the host computer 1 and a multifunctional machine 2 are the same as those in the first and second embodiments.

Figures 9, 10:
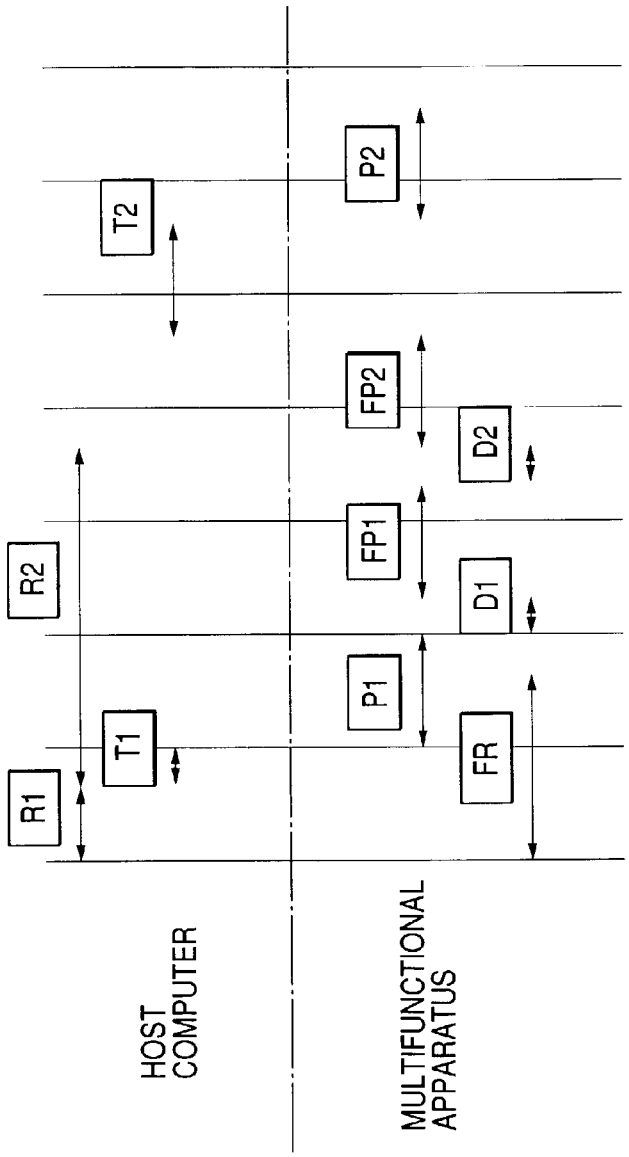
FIG. 9 is a timing chart showing a facsimile reception process in a printer print process in the information processing system according to the third embodiment.
FIG. 10 is a table showing a time taken for a rendering process in a print job, a time taken for print data transfer, a determined unused time (free time) of a printer engine which are estimated by the host computer before the printing.

FIG. 9 is a timing chart showing a facsimile reception process in a printer print process in an information processing system (composed of the host computer 1 and the multifunctional machine 2) according to the third embodiment of the present invention.

In the present embodiment, while print data of a next page is being rendering-processed by the host computer 1 after a print process P1 starts (R2), the facsimile-received data is printed (FP1, FP2). Thus, as compared with the conventional system that a print process P2 is performed after the print process P1, or that print processes FP1 and FP2 are performed after the print process P1 and thereafter the print process P2 is performed after the rendering process R2, an unused time of the printer engine due to the rendering process by the host computer 1 can be efficiently used, whereby a total processing time can be shortened.

FIG. 10 is a table showing the time taken for the rendering process in the print job, a time taken for print data transfer, a determined unused time of the printer engine which are estimated by the host computer 1 before the printing. The unused time of the printer engine is calculated as follows.

The unused time of the printer engine 4 is estimated as follows.

1. The printer speed (ppm) is stored beforehand in the host computer together with sheet size. That is, the data of one sheet can be printed by 4 seconds with the printer speed of 15 ppm (P).
2. The data transfer speed between the host computer 1 and the multifunctional machine 2 is calculated beforehand. That is, the calculated speed is 1 MB/s.
3. Before the host computer 1 starts processing a printer job, a time taken to perform the rendering process of the data of each page in this job and the number of bytes of the print data to be transferred to the printer are estimated. Here, the rendering time R1 is estimated as 10 seconds, the rendering time R2 is estimated as 20 seconds, the number of bytes of the print data is estimated as 2 MB, and the transfer time T2 of the print data is calculated as T1=2 MB÷1 MB/s=2 seconds.
4. If timing of the print start by the printer is set when the data transfer to the printer controller 3 ends, the unused time of the printer engine is obtained as shown in FIG. 10. That is, the engine unused time=$R_{n+1}-(T_n+P)=20-(2+4)=14$ seconds is obtained.

In the above calculation, since there is the unused time of 14 seconds between the first and second pages, interrupt of the printing of the facsimile-received data can be performed in the unused time.

Figure 11:
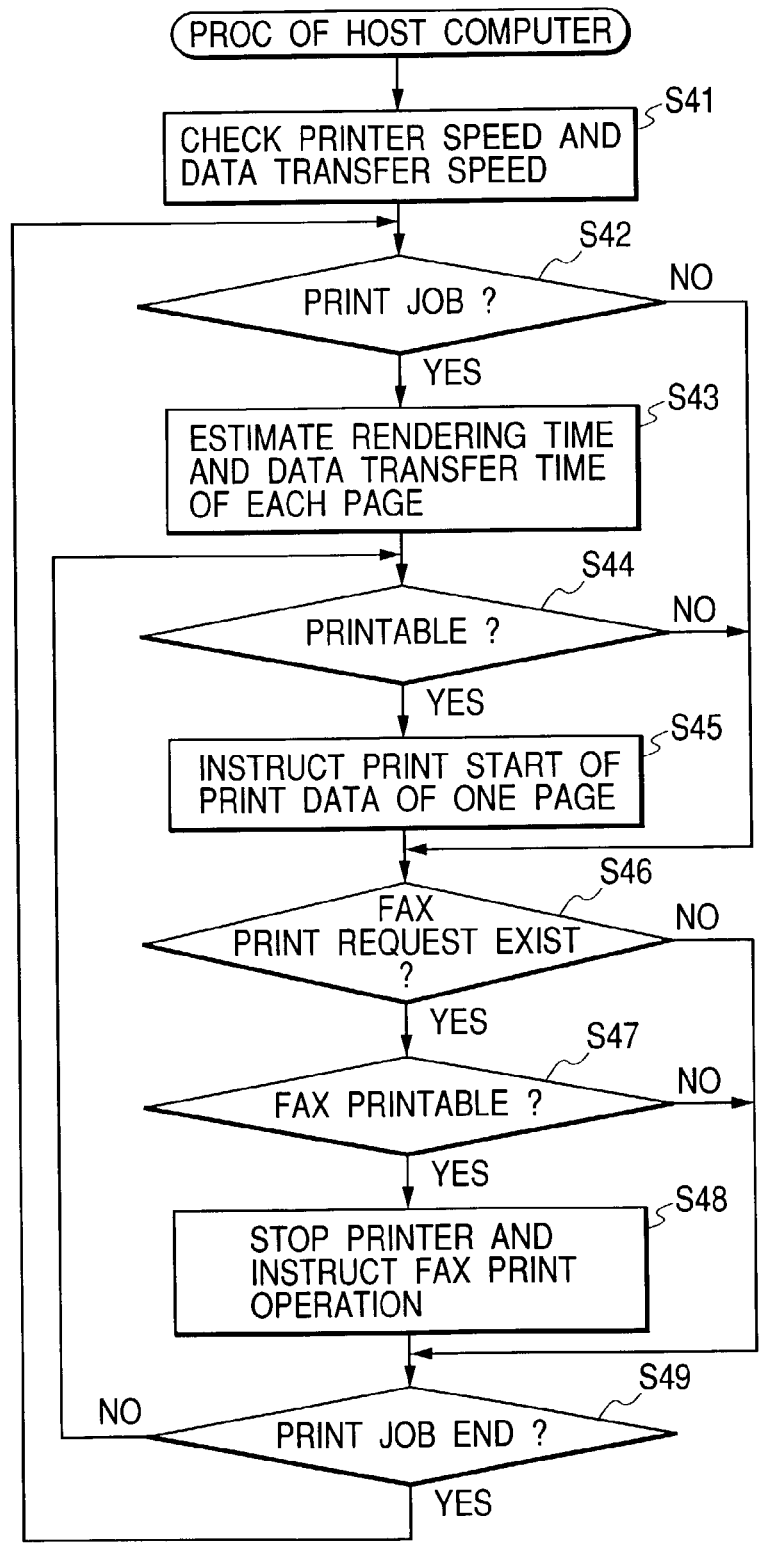
FIG. 11 is a flow chart showing the process of the host computer according to the third embodiment.

FIG. 11 is a flow chart showing the process of the host computer 1 according to the third embodiment. Here, it should be noted that the program according to this flow chart is stored in a ROM 53 of the host computer 1 or an external memory 61, and the stored program is read and executed, whereby the following control method can be achieved.

First, in a step S41, the print speed of the printer is obtained from the multifunctional machine 2, and the print data transfer speed from the host computer 1 to the multifunctional machine 2 is discriminated.

In a step S42, it is judged whether or not a print job exists. Then, in a step S43, the time taken for the rendering process of each page in the print job and a print data amount are estimated, and the unused time of the printer engine 4 is obtained in the above manner. As the method of estimating the rendering time and the print data amount, a method of performing the estimation based on an area occupied by the characters of the former print data, a method of performing the estimation based on an area occupied by the images of the former data, a method of performing partial rendering may be adopted. Of course, a method other than the above method may be adopted.

Then, in a step S44, it is judged by the host computer 1 whether or not the multifunctional machine 2 is in a printable state (i.e., it is judged whether or not the printer engine 4 is being used to print copy data or facsimile data), and, in a step S45, it is instructed from the host computer 1 to start printing the print data of one page. Then, the rendering process of the one page is started based on another program, and the rendering-processed print data of the one page is transferred to the multifunctional machine 2.

In a step S46, it is judged whether or not there is a print request for the facsimile-received data, and, in a step S47, it is further judged based on the result estimated in the step S43 whether or not there is an unused time for the printer engine 4 and printable timing is given. Then, in a step S48, if the print data transferred from the host computer 1 is being printed, the facsimile-received data already received before the next page is printed is printed ahead. After then, in a step S49, it is judged whether or not the print job from the host computer 1 ends.

Like the above-explained first and second embodiments, in the process concerning the printing on the side of the multifunctional machine 2, the print data sent from the host computer 1 and the facsimile data received and sent from the FAX unit 6 are sequentially printed on the basis of the control of the host computer 1. In the present embodiment, the interrupt of another print process is performed on the basis of the estimation of the unused time of the printer engine 4 (i.e., the time that the printer engine 4 is suspended to wait for the end of the process on the side of the host computer 1). Moreover, of course, it is needles to say that the printing by the multifunctional machine 2 includes a copy job to print the image data transferred from the scanner unit 5.

Fourth Embodiment

In the present embodiment, the buffer in the third embodiment to store the print data is modified to double buffers, whereby facsimile-received data can be transferred through a DMA channel while print data transferred from a host computer 1 is being printed, and moreover a printer stop time can be shortened.

Figure 12:
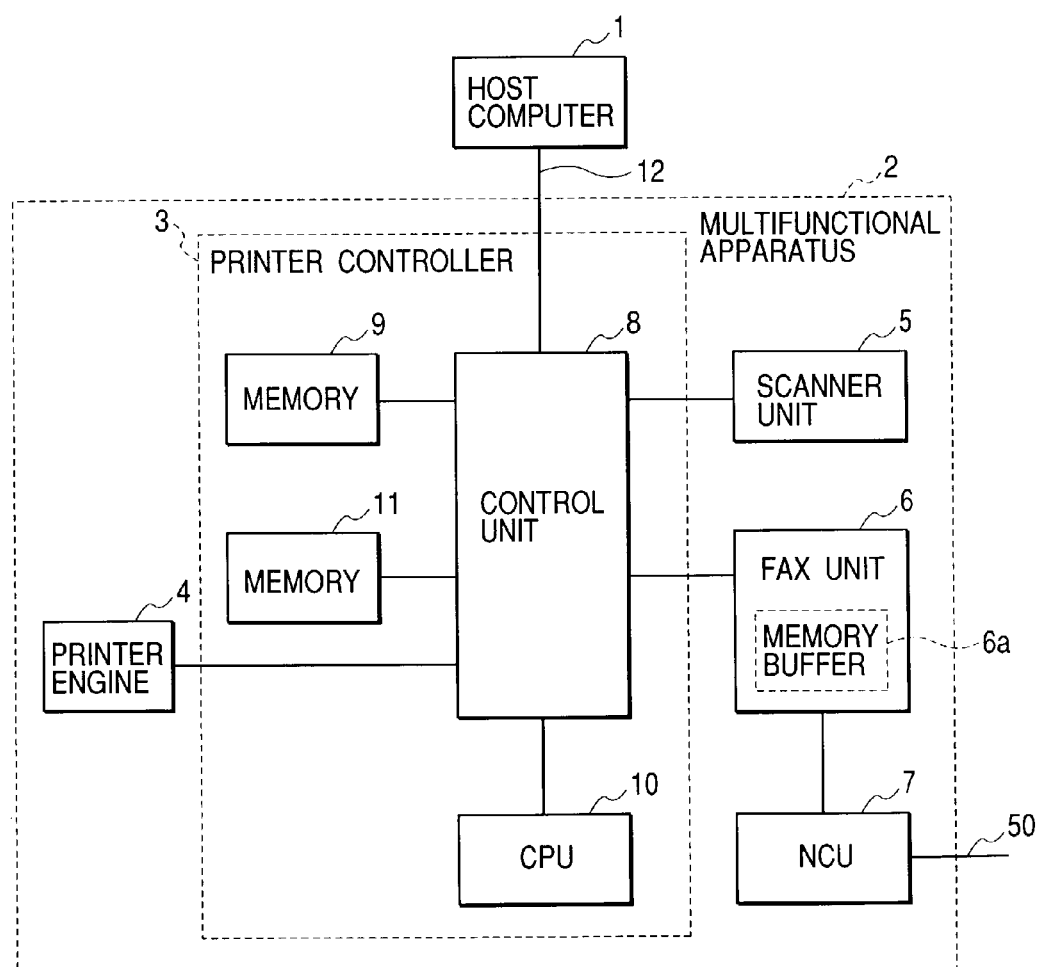
FIG. 12 is a block diagram showing the structure of a multifunctional machine included in an information processing system according to the fourth and sixth embodiments of the present invention.

FIG. 12 is a block diagram showing the structure of a multifunctional machine included in an information processing system according to the fourth embodiment of the present invention.

In FIG. 12, it is assumed that the parts added with the same reference numerals as those in FIG. 1 respectively achieve the same functions as those in FIG. 1. In the present embodiment, a memory 11 as well as a memory 9 is provided to temporarily store the print data. The memories 9 and 11 together constitute the double-buffer structure, and the data of the page to be printed next to the page being printed can be stored beforehand by switching them for each page.

Figure 13:
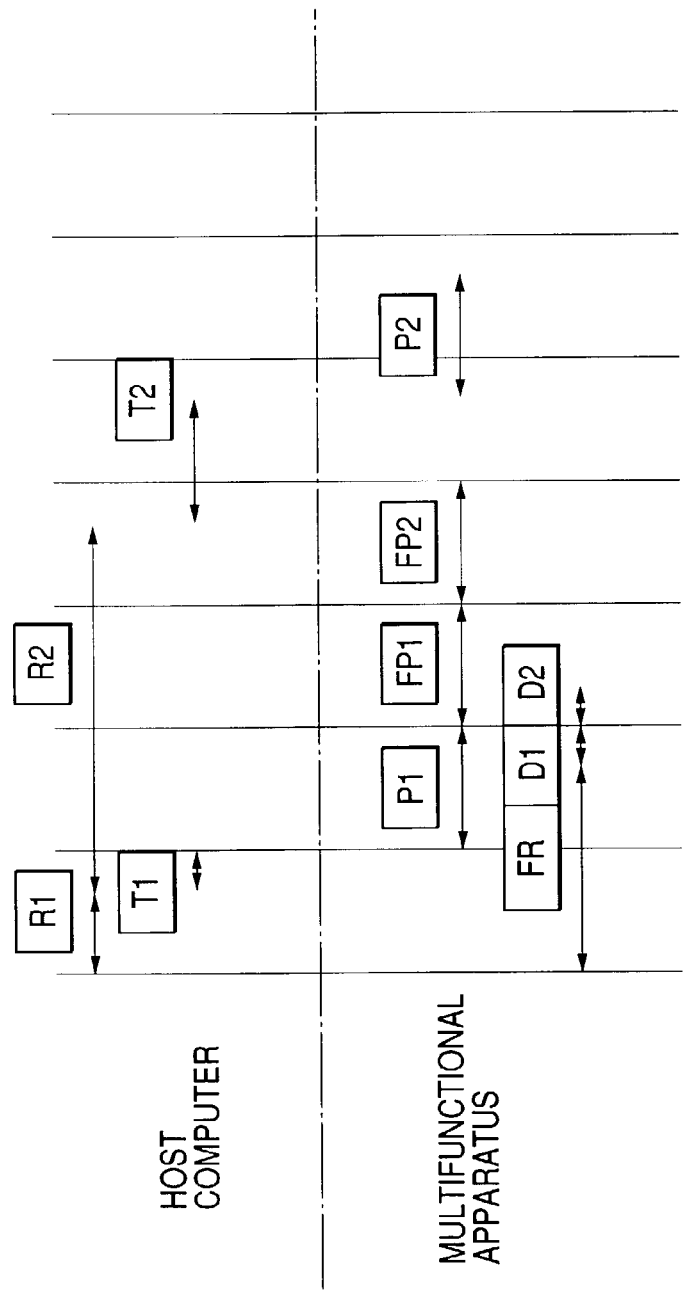
FIG. 13 is a timing chart showing a facsimile reception process in a printer print process in the information processing system according to the fourth embodiment.

FIG. 13 is a timing chart showing a facsimile reception process in a printer print process in the information processing system (composed of the host computer 1 and a multifunctional machine 2) according to the fourth embodiment of the present invention.

As shown in FIG. 13, in the present embodiment, the facsimile-received data is transferred to a printer controller 3 through the DMA channel while print data transferred from the host computer 1 is being printed, whereby an unused time of a printer engine 4 is minimized. This can be achieved by allocating, while one of the memories 9 and 11 is being used to print the print data transferred from the host computer 1, the other of the memories 9 and 11 to print the facsimile-received data.

The host computer 1 estimates, prior to the printing, a rendering time and a print data transfer time in processing a print job, and calculates the unused time of the printer engine from the estimated data. Like the third embodiment, a table as shown in FIG. 10 is formed by the above unused time calculation process.

Incidentally, since the structure of the host computer 1 in the present embodiment is the same as that in the previous embodiments, the explanation thereof will be omitted.

Figure 14:
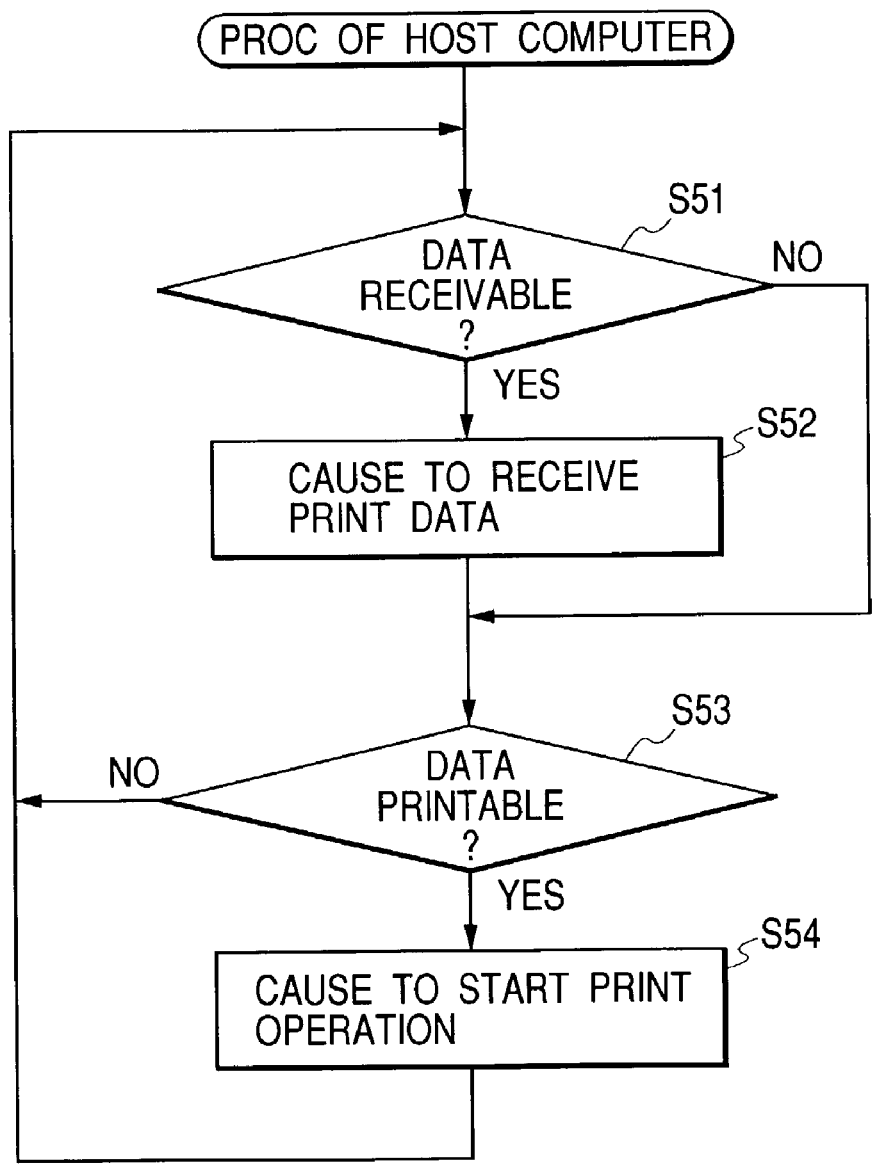
FIG. 14 is a flow chart showing the process of the host computer according to the fourth embodiment.

FIG. 14 is a flow chart showing the process of the host computer 1 according to the fourth embodiment. Here, it should be noted that the program according to this flow chart is stored in a ROM of the host computer 1 or an external memory, and the stored program is read and executed, whereby the following control method can be achieved.

First, in a step S51, it is judged whether or not a vacancy exists in the memories 9 and 11 (double buffer) in the printer controller 3 of the multifunctional machine 2. Here, it should be noted that, even if one buffer is being used, another data can be received and stored in the other buffer.

Then, the flow advances to a step S52 to start the reception of print data from the host computer 1 or a FAX unit 6. Next, in a step S53, if the buffer to which the reception of the print data of one page has been completed exist, it is judged that the print data can be printed. In a step S54, if it is judged that the print data can be printed, the print data in question is transferred from the reception-completed buffer to the printer engine 4 to start the printing.

As above, according to the present embodiment, since the two independent print jobs are executed in parallel, the unused time of the printer engine 4 is minimized, thereby making the print operation more efficient.

Fifth Embodiment

In the present embodiment, a process to be performed when a print instruction is issued from a host computer 1 after a start of reception of facsimile data. It should be noted that the present embodiment aims to perform interrupt for printing of print data from the host computer 1 by using an unused time of a printer engine 4 while the facsimile-received data is being printed.

In the present embodiment, it is assumed that the structure of a multifunctional machine 2 is the same as that in FIG. 1 and also the structure of the host computer 1 is the same as that in FIG. 2.

Figure 15:
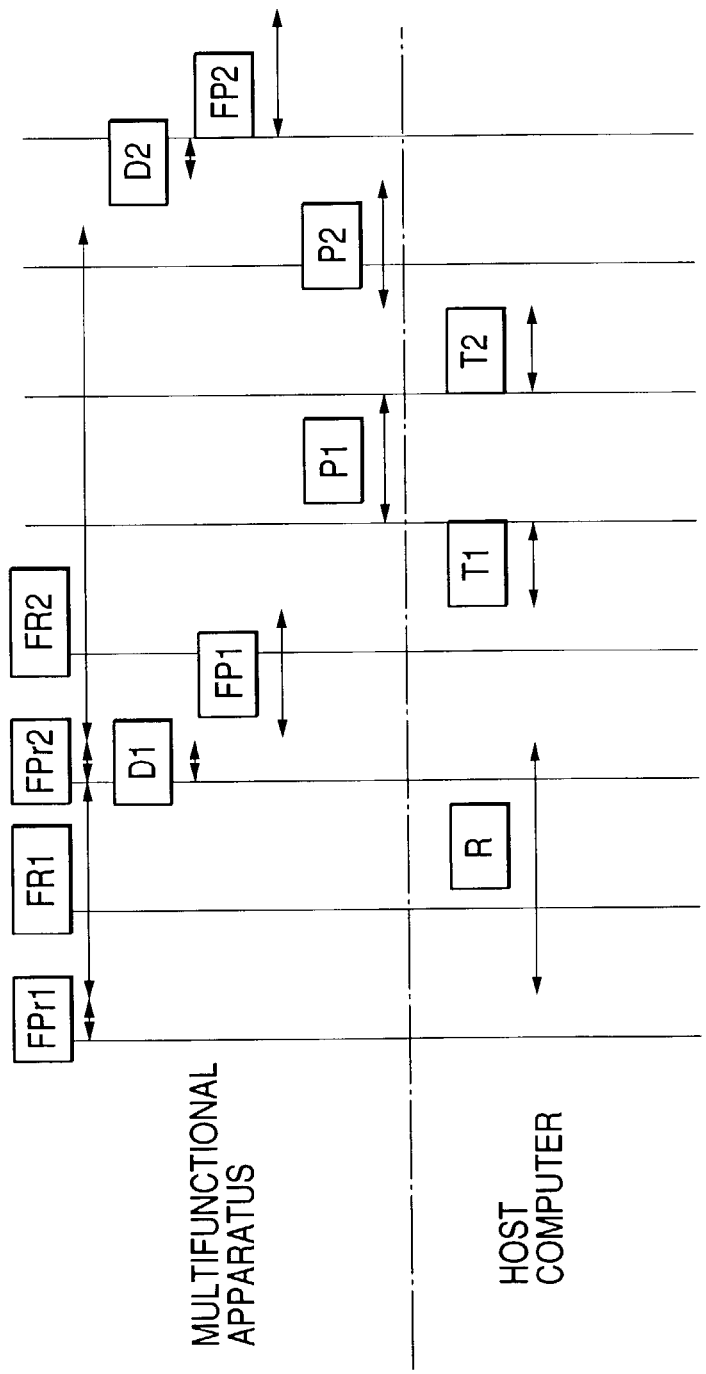
FIG. 15 is a timing chart showing a printer print process in a facsimile reception process in the information processing system according to the fifth embodiment.

FIG. 15 is a timing chart showing a printer print process in the facsimile reception process in an information processing system (composed of the host computer 1 and the multifunctional machine 2) according to the fifth embodiment.

FIG. 15 will be explained. hereinafter. First, a protocol process to receive the facsimile data is performed in the multifunctional machine 2 (FPr1), and the facsimile data of the first page is received (FR1). On the other hand, a rendering process for the printing is started in the host computer 1 (R), the printing of the facsimile-received data of the first page is prepared, the facsimile-received data is transferred from a FAX unit 6 to a printer controller 3 (D1), and the transferred data is actually printed (FP1). Moreover, at the same time of the data transfer (D1), a protocol process for receiving the data of the second page is performed by the FAX unit 6 (FPr2).

The facsimile reception status of the processes FPr1 and FPr2 is given to the host computer 1, and, based on the transferred information, it is determined by the host computer 1 whether or not the interrupt and printing for the print job from the host computer 1 should be performed while the facsimile data is being received. In an example shown in FIG. 15, it is judged that the print job from the host computer 1 can be printed during the time of the process FPr2, the print data is transferred (T1, T2), and the transferred data is actually printed (P1, P2).

Next, after the data is received by the FAX unit 6 (FR2), a print request is issued from the FAX unit 6 to the host computer 1. Then, if the print job of the host computer 1 by the multifunctional machine 2 ends (P1, P2), the host computer 1 instructs the multifunctional machine 2 to print the facsimile-received data. The facsimile data is then transferred from the multifunctional machine 2 to the printer controller 3 (D2), and the transferred data is actually printed (FP2).

This aims to improve efficiency by performing the printing of the print data from the host computer 1 in a case where it is judged that the printer engine 4 is unused between the printing of the facsimile data of the first page and the printing of the facsimile data of the second page.

Figure 16:
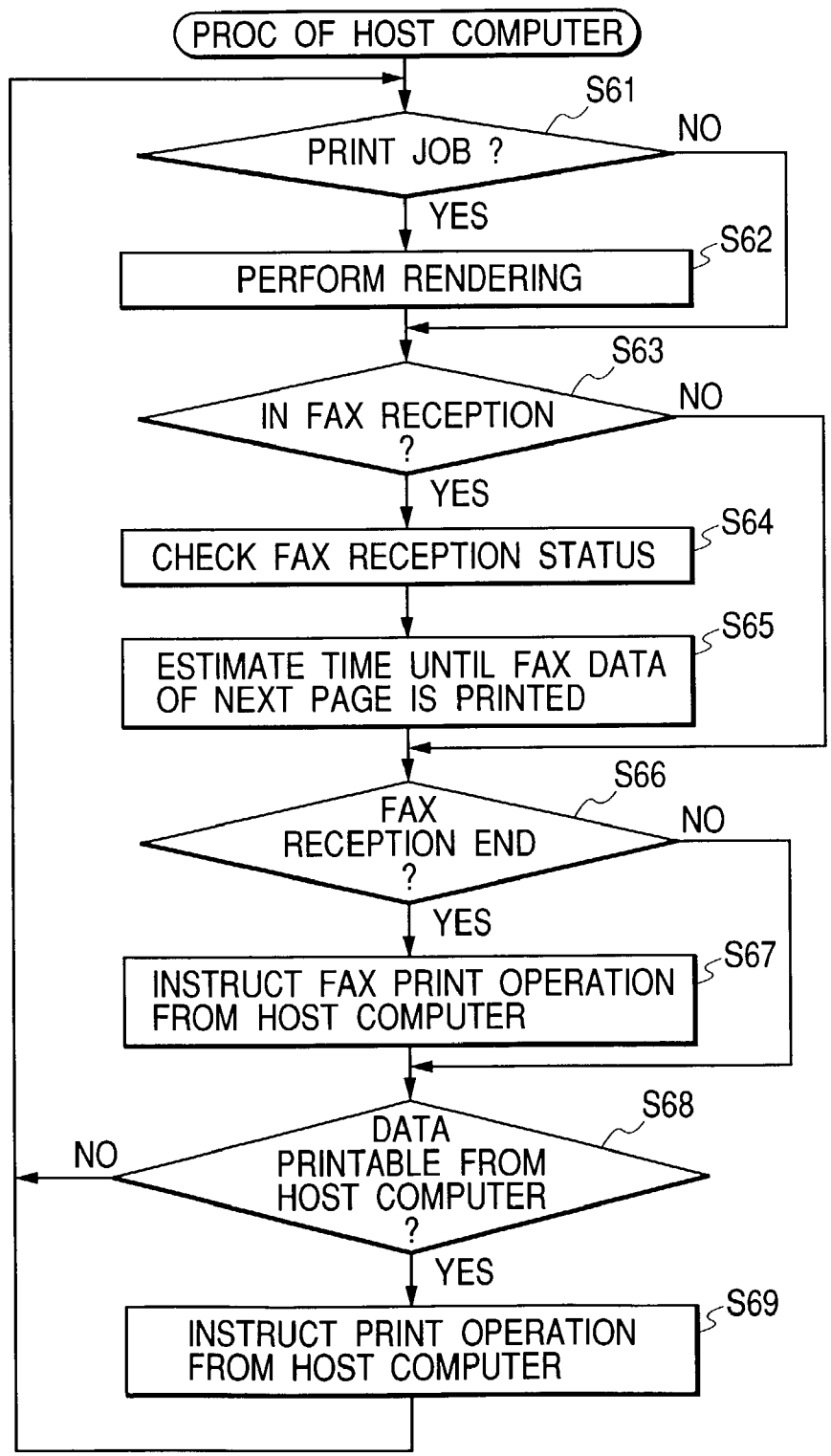
FIG. 16 is a flow chart showing the process of the host computer according to the fifth embodiment.

FIG. 16 is a flow chart showing the process of the host computer 1 according to the fifth embodiment, and, it should be noted that the program according to this flow chart is stored in the ROM 53 of the host computer 1 or the external memory 61, and the stored program is read and executed, whereby the following control method can be achieved.

First, it is judged in a step S61 whether or not the print job exists in the host computer 1, a rendering process of the print job is performed in a step S62, and it is judged in a step S63 whether or not the multifunctional machine 2 is receiving the facsimile data. Then, in a step S64, the reception status of the FAX unit 6 is checked (i.e., information such as facsimile communication speed, a sheet size and the like is obtained from the multifunctional machine 2).

In a step S65, a time taken until the facsimile-received data of the next page is printed is estimated on the basis of the information obtained in the step S64. Then, in a step S66, it is judged whether or not the data of one page is received by the FAX unit 6 and the printer engine is in a state capable of printing the received data. If judged in the step S66 that the reception of the data of the one page is completed and the received data is printable, the flow advances to a step S67, while if not judged so, the flow advances to a step S68.

In the step S67, an instruction to start printing the facsimile-received data is issued from the host computer 1. Then, in the step S68, it is judged whether or not the print job of the host computer 1 exists and the rendering process to the data is completed, and further judged whether or not the printer engine 4 is in the printable state. Besides, if the facsimile data is being printed, it is further checked whether or not this data can be printed within the estimated time (estimated in the step S65) of the time of the process FR2 (i.e., the unused time of the printer engine 4). Then, in a step S69, it is instructed by the host computer 1 to start the printing of the print job.

By the above procedure, the print job from the host computer 1 is executed by using the unused time of the printer engine 4 in the print process of the data being received by the FAX unit 6.

Sixth Embodiment

In the present embodiment, double buffers are provided as a buffer means to store print data, and, when facsimile data of one page is received, the facsimile-received data is then stored in one, for storing data (unprinted data) received from a host computer 1, of the double buffers, whereby interrupt printing is performed.

In the present embodiment, the structure to notify the storage status of a reception buffer in a FAX unit 6 of a multifunctional machine 2 is provided in the host computer 1, and the facsimile-received data is transferred to one of the two buffers used by the host computer 1 (one used to transfer the print data to a printer engine 4, and the other used to store the data received from the host computer 1) which one is used to receive the print data (unprinted data) from the host computer 1 (in this case, data transfer from the host computer 1 is suspended), whereby interrupt for the printing of the facsimile data is performed to the printing of the data transferred from the host computer 1.

In the present embodiment, it is assumed that the structure of the multifunctional machine 2 is the same as that in FIG. 12 and also the structure of the host computer 1 is the same as that in FIG. 2.

Figure 17:
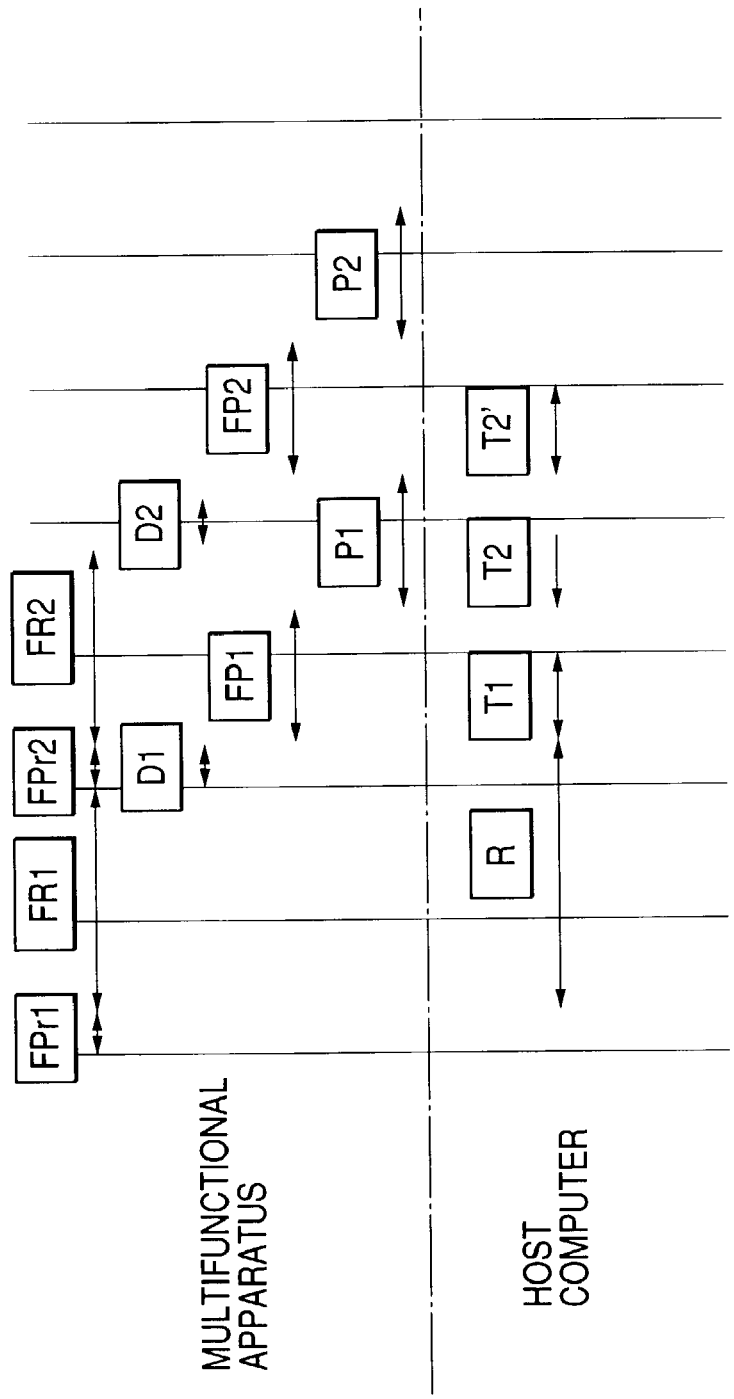
FIG. 17 is a timing chart showing a printer print process in a facsimile reception process in the information processing system according to the sixth embodiment.

FIG. 17 is a timing chart showing a printer print process in a facsimile reception process in an information processing system (composed of the host computer 1 and the multifunctional machine 2) according to the sixth embodiment.

FIG. 17 will be explained hereinafter. After the process to receive the facsimile data of the first page is performed in the multifunctional machine 2 (FPr1), a rendering process for the printing is started in the host computer 1 (R), the facsimile-received data is then transferred from the FAX unit 6 to a printer controller 3 (D1), and the transferred data is actually printed (FP1). Moreover, at the same time of the start of the data transfer, a process to receive the facsimile data of the second page is started (FP2). The reception status (reception speed, a reception sheet size, etc.) of the FAX unit 6 at this time is captured by the host computer 1, and, based on the captured information, a time taken until the facsimile data of a next page is printed is estimated by the host computer 1.

At this time, the host computer 1 judges that there is a time taken to print the data of the two pages in the print job of the host computer 1, and thus starts the printing (T1, P1, T2). However, if the reception of the facsimile data ends earlier than the estimation and thus room goes out of existence in the buffer of the FAX unit 6, the multifunctional machine 2 requests the host computer 1 to print the facsimile data by suspending the printing of the data of the host computer 1. Thus, the host computer 1 suspends the transfer of the print data in the process T1, receives the print request from the FAX unit 6, and then instructs the multifunctional machine 2 to print the facsimile data.

Thus, the transfer of the facsimile data (D2) is started, and the printing is performed (FP2). If this printing ends, the host computer 1 resends the print data to perform the suspended printing (T2'), whereby the printing is performed (P2).

Thus, even if an error occurs when the unused time of the printer engine 4 in the multifunctional machine 2 is estimated by the host computer 1, the printing can be performed without any communication error, and, moreover, a total printing time can be shortened.

Figure 18:
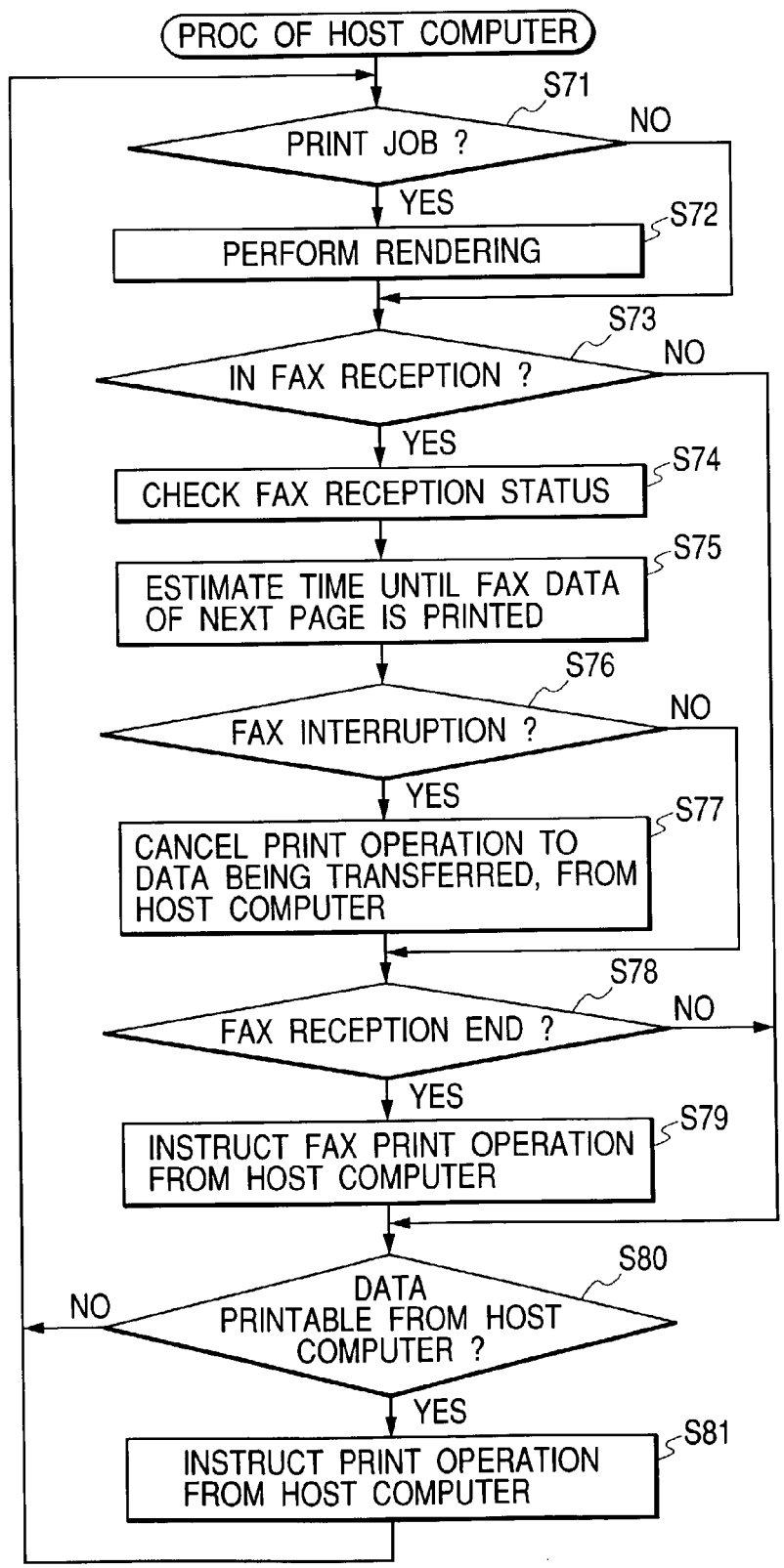
FIG. 18 is a flow chart showing the process of the host computer according to the sixth embodiment.
Figure 19:
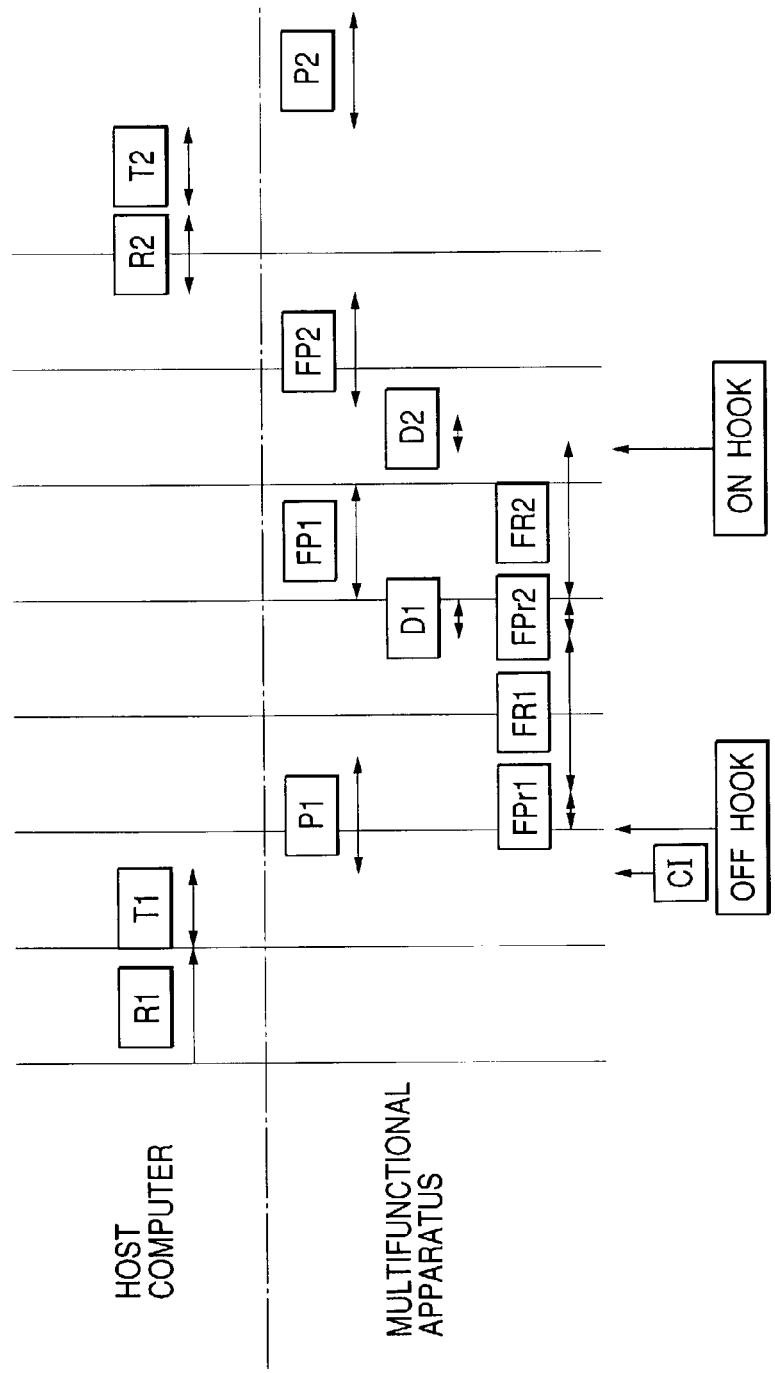
FIG. 19 is a timing chart showing a facsimile reception process in a print process in a conventional information processing system.

FIG. 18 is a flow chart showing the process of the host computer 1 according to the sixth embodiment, and, it should be noted that the program according to this flow chart is stored in a ROM of the host computer 1 or an external memory, and the stored program is read and executed, whereby the following control method can be achieved.

First, it is judged in a step S71 whether or not the print job exists in the host computer 1, a rendering process of the print job is performed in a step S72, and it is judged in a step S73 whether or not the multifunctional machine 2 is receiving the facsimile data. Then, in a step S74, the reception status of the FAX unit 6 is checked.

In a step S75, a time taken until the facsimile data of the next page is printed and output is estimated on the basis of the information obtained in the step S74. Then, in a step S76, in the state that the host computer 1 uses the printer engine 4 to perform the printing, it is judged whether or not there is a fear that a communication error occurs because there is no room in the buffer of the FAX unit 6.

In steps S77 to S79, since it is judged in the step S76 that there is the fear that the communication error occurs, the host computer 1 cancels the latter one of the self-used two buffers (i.e., one used in case of transferring the print data to be printed from now to the printer engine 4, and the other used in case of receiving the print data to be next printed from the host computer 1), and instead transfers the print data from the FAX unit 6 to instruct the multifunctional machine 2 to perform the printing.

In a step S80, it is judged whether or not the printing of the print job of the host computer 1 can be performed. Then, in a step S81, the printing of the print job of the host computer 1 is instructed, and the print data is transferred.

Here, it should be noted that the explanation of the operation concerning the printing of the multifunctional machine 2 in the present embodiment will be omitted because it is the same as that in the above embodiments.

The present invention is not limited to the apparatuses in the above embodiments, but is applicable to a system composed of plural devices or to an apparatus including a single device. Moreover, it is needless to say that the object of the present invention can be achieved in a case where a storage medium storing program codes of software for realizing the functions of the above embodiments is supplied to a system or an apparatus and then a computer (or CPU or MPU) in the system or the apparatus reads and executes the program codes stored in the storage medium.

In this case, the program codes themselves read from the storage medium realize the functions of the above embodiments, and the storage medium storing these program codes constitute the present invention. As the storage medium storing the program codes, e.g., a floppy disk, a hard disk, an optical disk, a magnetooptical disk, a CD-ROM, a CD-R, a magnetic tape, a non-volatile memory card, a ROM, or the like can be used. Moreover, it is needless to say that the present invention also includes not only the case where the functions of the embodiments are realized by executing the program codes read by the computer, but also a case where an OS or the like functioning on the computer executes all the process or a part thereof according to the instructions of the program codes, thereby realizing the functions of the above embodiments.

Moreover, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of these program codes, thereby realizing the functions of the above embodiments.

According to the above embodiments, it is possible to reduce the waiting time for the printing as much as practical and efficiently perform the plural print processes. Moreover, since there is no need to store a large amount of data on the side of the printer, a large-capacity memory need not be mounted, whereby the apparatus can be manufactured at a low price. Moreover, even if the speed of the printer engine is not so high, a convenient printer can be provided.

What is claimed is:

1. A print control apparatus which is connected to a multifunctional printer for printing images based on various data including at least facsimile data, comprising:
 a transmitter for transmitting print data to the multifunctional printer;
 a detector for detecting whether a call signal CI transmitted through a telephone line is received by a facsimile unit of the multifunctional printer;

an estimator for estimating an estimated end time of a print operation being performed by the multifunctional printer, based on the print data transmitted by the transmitter;
a determiner for determining whether to receive the facsimile data before the print operation ends or to receive the facsimile data after the print operation ends based on the estimated end time estimated by said estimator when said detector detects the call signal CI while the print operation is being performed; and
a controller for controlling a timing for capturing the telephone line by transmitting an instruction to start the reception of the facsimile data to the multifunctional printer,
wherein said controller transmits the instruction in response to the detection of the call signal CI by said detector and when said determiner determines to receive the facsimile data before the print operation ends, and transmits the instruction in response to the end of the print operation when said determiner determines to receive the facsimile data after the print operation ends.

2. A method of controlling a multifunctional printer for printing images based on various data including at least facsimile data, comprising the steps of:
transmitting print data to the multifunctional printer;
detecting whether a call signal CI transmitted through a telephone line is received by a facsimile unit of the multifunctional printer;
estimating an estimated end time of a print operation being performed by the multifunctional printer, based on the print data transmitted by the transmitter;
determining whether to receive the facsimile data before the print operation ends or to receive the facsimile data after the print operation ends based on the estimated end time estimated by the estimator when said detector detects the call signal CI while the print operation is being performed; and
controlling a timing for capturing the telephone line by transmitting an instruction to start the reception of the facsimile data to the multifunctional printer,
wherein said controlling step includes transmitting the instruction in response to the detection of the call signal CI in said detecting step and when in said determining step a determination is made to receive the facsimile data before the print operation ends, and includes transmitting the instruction in response to the end of the print operation when in said determining step a determination is made to receive the facsimile data after the print operation ends.

3. A print control system comprising a print control apparatus and a multifunctional printer, connected to said print control apparatus, for printing images based on various data including at least facsimile data,
wherein said multifunctional printer comprises:
a first transmitter for transmitting a signal indicating that said multifunctional printer is receiving a call signal CI transmitted through a telephone line; and
wherein said print control apparatus comprises:
a second transmitter for transmitting print data to the multifunctional printer;
a detector for detecting whether the call signal CI transmitted through the telephone line is received by a facsimile unit of the multifunctional printer based on the signal transmitted by said first transmitter;
an estimator for estimating an estimated end time of a print operation being performed by said multifunctional printer, based on the print data transmitted by the transmitter;
a determiner for determining whether to receive the facsimile data before the print operation ends or to receive the facsimile data after the print operation ends based on the estimated end time estimated by said estimator when said detector detects the call signal CI while the print operation is being performed; and
a controller for controlling a timing for capturing the telephone line by transmitting an instruction to start the reception of the facsimile data to the multifunctional printer,
wherein said controller transmits the instruction in response to the detection of the call signal CI by said detector when said determiner determines to receive the facsimile data before the print operation ends, and transmits the instruction in response to the end of the print operation when said determiner determines to receive the facsimile data after the print operation ends.

* * * * *